May 20, 1924.
H. C. SMITH
ROLLER CANE
Filed July 10, 1923
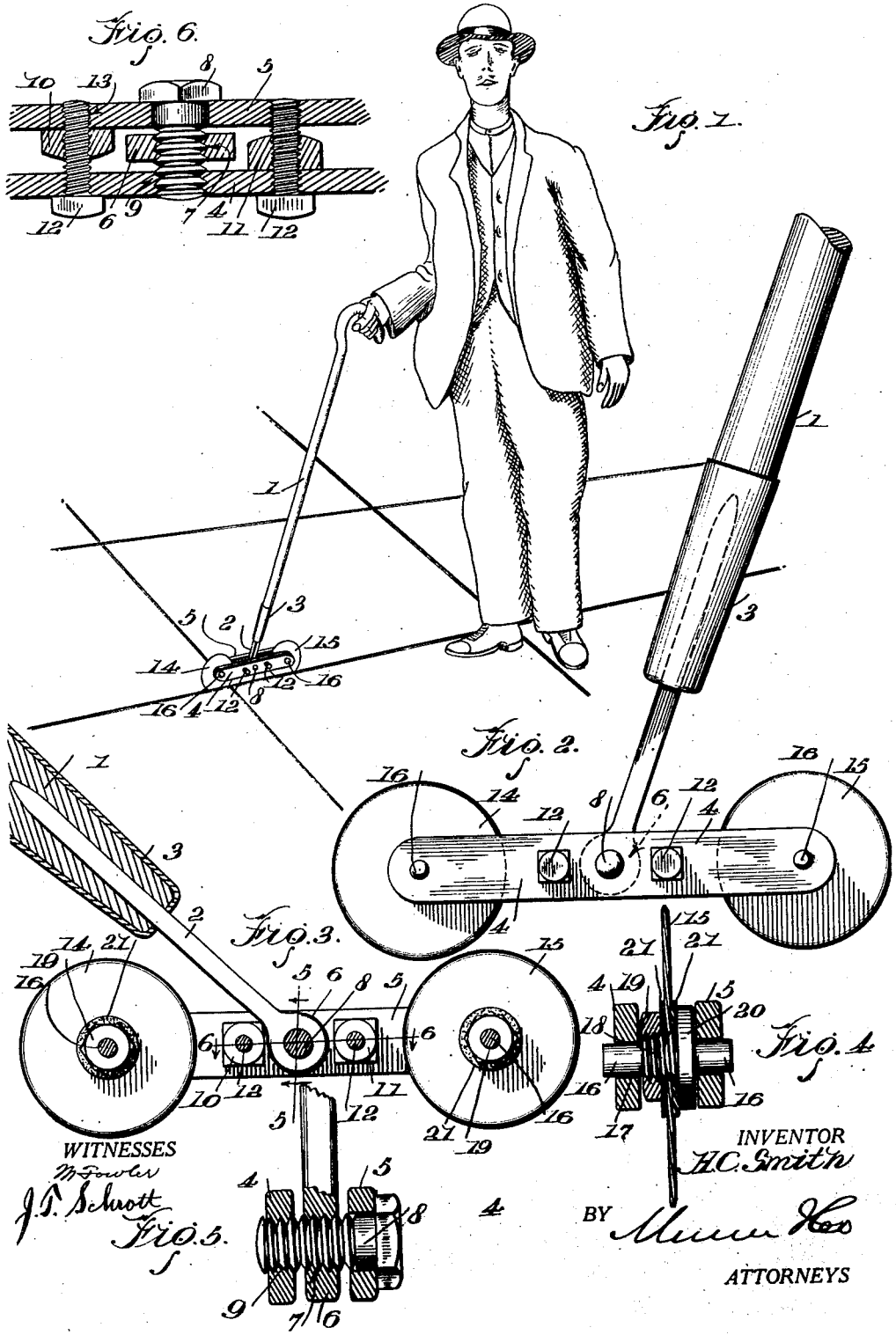

Patented May 20, 1924.

UNITED STATES PATENT OFFICE.

HENRY CALVIN SMITH, OF ABERDEEN, WASHINGTON.

ROLLER CANE.

Application filed July 10, 1923. Serial No. 650,700.

*To all whom it may concern:*

Be it known that I, HENRY CALVIN SMITH, a citizen of the United States, and a resident of Aberdeen, in the county of Grays Harbor and State of Washington, have invented certain new and useful Improvements in Roller Canes, of which the following is a specification.

My invention relates to improvements in canes and it consists of the constructions, combinations and arrangements herein described and claimed.

An object of the invention is to provide an improved cane adapted for use primarily by blind persons, such cane being provided with one or more guide wheels which are arranged to run in certain seams in the sidewalk so that the user may be guided in traveling.

Other objects and advantages will appear in the following specification, reference being had to the accompanying drawing, in which:

Fig. 1 is a perspective view illustrating the improved cane in use,

Fig. 2 is a side elevation of the guiding devices of the cane,

Fig. 3 is a longitudinal section showing how the shank is prevented from striking either guide wheel by means of the lock nut on the inside, Fig. 4 is a section through one of the guide wheels, taken substantially on the line 4—4 of Fig. 3, Fig. 5 is a section on the line 5—5 of Fig. 3 showing how the shank is pivotally mounted in the guide frame, and Fig. 6 is a detail longitudinal section on the line 6—6 of Fig. 3.

In carrying out the invention, provision is made of a cane 1 which may be of any desired construction. Fitted into the lower end of the cane and held in place therein by means of a ferrule 3 is a shank 2 which carries a guide frame consisting of side bars 4 and 5.

The exposed end of the shank 2 terminates in a circular enlargement 6 which has an opening 7 to receive the bolt 8 on which the shank 2 and consequently the cane 1, are pivoted. The opening 7 is threaded, and such rocking motion of the shank 2 as may be had by moving the cane 1 back and forth, occurs on the threads which come within the confines of the enlargement 6. The bolt 8 is screwed through the guide frame from one side (Fig. 5) the bar 4 having a threaded opening 9 to receive and hold the bolt by means of the threads thereon.

Mention was just made of the rocking motion of the shank 2. This motion is limited by lock nuts 10 and 11 which are situated in the space between the bars 4 and 5. These nuts are carried by bolts 12 which, like the bolt 8, are screwed through the guide frame. For this purpose, the holes 13 in the bars 4 and 5 (Fig. 3) through which the bolts pass, are in all cases threaded. The threads on the bolts 12 and in the holes 13 would alone suffice to hold the bars 4 and 5 in spaced relation, but in order to insure against the bolts 12 working loose, the lock nuts 10 and 11 are provided to hold the bolts rigid.

It is to be observed in Fig. 6 that the lock nuts are screwed up tight against the respective bars of the guide frame. For instance, the lock nut 10 is screwed up tight against the bar 5 while the nut 11 is screwed up tight against the bar 4. This arrangement aids in spacing the bars and keeping them in place. Besides the spacing and locking functions ascribed to the nuts 10 and 11, they serve as limiting means for the shank 2, preventing the shank from falling over and striking the edge of either guide wheel 14 or 15 should the user let the cane 1 fall.

These guide wheels are respectively carried by shafts 16, one of which is shown in detail in Fig. 4 and to which figure the description of the guide wheel mounting is confined. The ends of the shaft 16 are made in the shape of trunnions which run in holes 17 in the side bars 4 and 5. A threaded portion 18 substantially in the middle of the shaft 16 carries the guide wheel 15, a nut 19 which works on the threads, serving to press the guide wheel against a flange 20. The flange is an integral part of the shaft 16. Obviously it is situated on the side of the guide wheel 15 opposite to the nut 19. Leather, rubber, or other suitable washers 21 are fitted to take places adjacent to the flange and nut respectively. The washers aid in tightly gripping the guide wheel and so prevent the guide wheel from working loose. Here the value of the lock nuts 10 and 11 will become more fully apparent. It is necessary to so space the side bars 4 and 5 that neither will bind against the nut 19 and flange 20 respectively. The bolts 12 (Fig. 6) will be screwed into position so that the proper spacing of the side bars is obtained, whereupon the lock nuts 10 and 11 are turned upon the bolts by means of a suitable wrench until they bind against the respective side bars, whereupon the latter become fixed in place so as not to interfere with the free movement of the guide wheel shaft 16. What is true of the one shaft 16, is also true of the other.

The operation of the roller cane seems obvious enough from the showing in Fig. 1. Cities (especially large cities) have many styles of concrete sidewalks on which the surface is divided into rather large blocks or squares by means of creases or lines pressed into the surface while the material is yet plastic. Persons afflicted with blindness are often to be observed feeling their way along the sidewalk by means of a cane, tapping here and there in order to strike possible obstacles. It is the purpose of the invention to enable the user, particularly a person afflicted as stated, to follow a substantially straight course along a street which is surfaced in the manner described. The guide wheel frame or carriage may be dragged crosswise until the wheels 14 and 15 fall into one of the creases. The user may thereupon proceed forwardly with the guide wheel in advance of him so that any obstacle in his path may be encountered before he may strike it himself.

Although the ideal condition for the use of the roller cane is the one in which a sidewalk has creases such as described, yet the good use of the cane is not impaired under circumstances where no such sidewalk is to be found. The arrangement of guide wheels in tandem causes the carriage to run in a substantially straight direction, especially when the user holds the cane 1 in such a position from which this desirable movement of the carriage is facilitated. The user can readily feel when the carriage has a tendency to move to one side or the other of a substantially straight path, and by coordinating the function of feeling with the motion of the guide wheel carriage, the user will be enabled to walk in a substantially straight path.

While the construction and arrangement of the improved roller cane as herein described and claimed, is that of a generally preferred form, obviously modifications and changes may be made without departing from the spirit of the invention or the scope of the claims.

I claim:—

1. A cane having a shank fastened thereto, a frame pivotally mounted on the shank, and guide wheels mounted in tandem on the frame to run on the ground surface to guide the holder of the cane.

2. A cane having a shank fastened thereto, a frame pivotally mounted on the shank, guide wheels mounted in tandem on the frame to run on the ground surface to guide the holder of the cane, and means on the frame limiting the rocking movement of the shank on said pivot to prevent striking either guide wheel upon letting the cane fall.

3. A cane having a shank fastened thereto, guide wheels arranged in tandem, a frame carrying the wheels composed of a pair of bars in which the wheels have bearing, means by which the shank is pivoted between the bars, and means for holding the bars in spaced relationship also serving as limiting means to prevent the shank from striking the edge of either wheel should the cane be dropped.

4. A cane having a shank fastened thereto, a pair of wheels disposed in tandem, a shaft for each wheel, a frame carrying the wheels comprising side bars in which the shafts have bearing, bolts screwed into said bars to space them apart, lock nuts on the bolts screwed against the respective side bars to maintain said spacing and prevent binding of said wheels, and a pivot bolt by means of which the shank is mounted on the frame between the bars said lock nuts serving as limiting means to prevent the shank from striking either wheel should the cane be dropped.

5. In a device of the character described, a frame composed of a pair of bars, guide wheels situated in the space between the bars, a shaft for each wheel including smooth end portions having bearing in the bars and a threaded medial portion upon which each wheel is mounted, a flange integral with each shaft, a nut on each threaded portion to press the wheel toward the flange, and washers disposed against the wheels on each side.

6. In a device of the character described, a frame composed of a pair of side bars, a shank pivotally mounted on the frame, and a bolt which constitutes said pivotal mounting being screwed through openings both in the shank and one of the side bars, rocking movement of the shank in respect to the frame being on the engaging threads of said bolt.

HENRY CALVIN SMITH.